US008898493B2

(12) United States Patent
Agarwal et al.

(10) Patent No.: US 8,898,493 B2
(45) Date of Patent: Nov. 25, 2014

(54) ARCHITECTURE TO ENABLE ENERGY SAVINGS IN NETWORKED COMPUTERS

(75) Inventors: Yuvraj Agarwal, San Diego, CA (US); Rajesh K. Gupta, San Diego, CA (US)

(73) Assignee: The Regents of the University of California, Oakland, CA (US)

( * ) Notice: Subject to any disclaimer, the term of this patent is extended or adjusted under 35 U.S.C. 154(b) by 922 days.

(21) Appl. No.: 13/054,471

(22) PCT Filed: Jul. 14, 2009

(86) PCT No.: PCT/US2009/050592
§ 371 (c)(1),
(2), (4) Date: Apr. 20, 2011

(87) PCT Pub. No.: WO2010/009164
PCT Pub. Date: Jan. 21, 2010

(65) Prior Publication Data
US 2011/0191610 A1 Aug. 4, 2011

Related U.S. Application Data

(60) Provisional application No. 61/134,824, filed on Jul. 14, 2008.

(51) Int. Cl.
G06F 1/26 (2006.01)
G06F 1/32 (2006.01)
G06F 9/44 (2006.01)
H04L 12/12 (2006.01)
G06F 9/455 (2006.01)
H04L 12/46 (2006.01)

(52) U.S. Cl.
CPC ............ *G06F 1/3203* (2013.01); *G06F 9/4418* (2013.01); *Y02B 60/32* (2013.01); *H04L 12/12* (2013.01); *Y02B 60/35* (2013.01); *Y02B 60/1278* (2013.01); *Y02B 60/148* (2013.01); *Y02B 60/34* (2013.01); *G06F 9/45533* (2013.01); *H04L 12/462* (2013.01); *G06F 1/3287* (2013.01); *Y02B 60/186* (2013.01); *Y02B 60/1282* (2013.01); *Y02B 60/146* (2013.01)

USPC ............... 713/310; 713/300; 713/320; 718/1; 718/104; 711/162; 711/203

(58) Field of Classification Search
USPC .............. 713/300, 310, 320, 323; 718/1, 104; 711/162, 203
See application file for complete search history.

(56) References Cited

U.S. PATENT DOCUMENTS

| 2002/0083110 A1 | 6/2002 | Kozuch et al. |
| 2006/0155912 A1 | 7/2006 | Singh et al. |
| 2006/0294351 A1 | 12/2006 | Rostampour |
| 2007/0067445 A1* | 3/2007 | Vugenfirer et al. ........... 709/224 |
| 2007/0073896 A1 | 3/2007 | Rothman et al. |
| 2007/0201667 A1* | 8/2007 | Finn et al. ................. 379/201.11 |

FOREIGN PATENT DOCUMENTS

CN 1823495 A 8/2006
WO WO-2005/020505 A1 3/2005

OTHER PUBLICATIONS

Agarwal, Y., et al., "Somniloquy: Maintaining network connectivity while your computer sleeps," Microsoft Research Disclosure Bulletin, TechReport MSR-TR-2008-42, 14 pages, Mar. 2008.

(Continued)

*Primary Examiner* — Michael J Brown
(74) *Attorney, Agent, or Firm* — Perkins Coie LLP

(57) ABSTRACT

This application includes systems and techniques that permit computers to remain accessible while in a low-power mode. In some implementations, the technique includes receiving at a first computer, via a computer network, information regarding a second computer transitioning to a low-power mode of operation; receiving at the first computer network communications designated for the second computer; processing at the first computer at least a portion of the network communications on behalf of the second computer without transitioning the second computer out of the low-power mode of operation, where the processing comprises processing the at least a portion of the network communications on behalf of the second computer within a virtual machine corresponding to the second computer; and initiating, via the computer network, a transition of the second computer out of the low-power mode of operation when at least one of the network communications satisfies a predetermined condition.

20 Claims, 6 Drawing Sheets

OTHER PUBLICATIONS

International Search Report and Written Opinion mailed on Feb. 23, 2010 for International Application No. PCT/US2009/050592, filed Jul. 14, 2009 (11 pages).

Werstein, P., "An Experimental Network Proxy for Power Managed End Nodes," *22nd International Conference on Advanced Information Networking and Applications Workshops*, p. 668-674, Mar. 2008.

* cited by examiner

ARCHITECTURE TO ENABLE ENERGY SAVINGS IN NETWORKED COMPUTERS

CROSS REFERENCE TO RELATED APPLICATIONS

This application claims priority under 35 U.S.C. 371 to International Patent Application No. PCT/US2009/050592, filed Jul. 14, 2009, which claims the benefit of U.S. Provisional Patent Application Ser. No. 61/134,824, filed Jul. 14, 2008. The entire contents of the before-mentioned patent applications are incorporated by reference as part of the disclosure of this application.

BACKGROUND

This application relates to computers and the management of sleep mode(s) of operation thereof.

Modern applications of computers contribute to significant energy usage. Therefore, computers are often designed with one or more modes of operation that use less energy for less delivered performance or increased time to be accessible to do useful work in a running mode. While a computer may be in a low use mode, it is often left running to enable remote access, Internet phone service, calendar and contact synching, and other widely popular applications. Though computers left running for such uses are mostly idle, the computers nonetheless consume significant power, which can over time lead to increased energy bills or short battery life. Tests show that an idle computer burns about the same electricity as a 100 Watt light bulb.

SUMMARY

The present disclosure includes systems and techniques that permit computers to remain accessible while in a low-power mode. One or more of the following advantages may be provided. Software, computers and networks of the invention can emulate specified minimal functions of a computer or multiple computers on a network server to make it appear to other applications, computers and network equipment that the computer or computers being emulated on a sleep-server system are active, even when the respective computers are in low power modes. As used herein, "sleep-server" refers to data processing apparatus (which can be multiple computers working together) that provide a sleep management service, such as described herein. Thus, a "sleep-server" need not be implemented as a stand alone server system. Rather, a "sleep-server" can be implemented in various manners, including without the use of a traditional server computer.

A sleep-server system can be implemented in various network devices, including as a distributed process operating on multiple network devices concurrently. A sleep-server system can activate the power-up cycle of a computer when activities of external applications or devices indicate the computer or computers being emulated should be powered up or otherwise made available for enhanced processing. Example situations indicating power-up can include an incoming remote access request or when an incoming Internet phone service call is detected.

The invention provides the potential for significant power usage reductions, especially on large scale networks. On a network operating with software of the invention, desktop and laptop computers that are idle and are connected to a server to be turned off or put to a low power mode, such as Sleep (ACPI state S3), can be transparently woken up when a specified event occurs. This specified event can include an incoming internet phone call, remote login request (Remote Desktop, File access), etc. The computers can maintain the illusion of accessibility (e.g., respond to ping messages, answer ARP (Address Resolution Protocol) requests, maintain DHCP (Dynamic Host Configuration Protocol) leases, etc.) even though they are in a low power mode. Since the computers are effectively in a low power state and can be woken up on demand, the energy savings can be substantial over long periods of use.

Implementation of the invention need not require any hardware changes to routers, switches, or any hardware additions to the desktop computers themselves that want to use the scheme. Computers that are to use the sleep management service can run software that supports communication with a "sleep-server" system, which can be a new server computer or server system, which can also perform more generalized network server functions. Alternatively, the "sleep-server" system can be implemented in other network devices, such as a network switch and a network router, or can be a distributed sleep management system that runs on multiple host computers on a computer network.

The invention can permit computers to save substantial power by transitioning to low power modes and still be accessible and be woken up to full power mode as desired. The invention need not require any hardware modification or additions to the individual computers, which makes it easy to implement in large networks.

In network systems of the invention, a sleep-server can maintain a virtual machine (VM) for each of the computers that have transitioned to a low power mode. The VMs on the sleep-server can thus act on behalf of each of the computers they represent. The VMs serve as agents of individual computers that can be run in a minimal memory and processor footprint, thus allowing hundreds of computers to be represented by a single sleep-server thus saving substantial energy.

In embodiments of the invention, before a host computer (e.g., desktop or laptop) goes to sleep (e.g., ACPI state S3-suspend to RAM) it transfers over events and specific applications triggers that it cares about to the sleep-server. These can be events such as "wake-up on Remote Desktop or SSH Request" or "Wake-up on Voice-over-IP call", etc. The sleep-server instantiates a new virtual-machine (VM) for the host computer and sets an address of its network interface to be the same as the host computer put to sleep; for example, the MAC (Media Access Control) address of its Ethernet interface can be set the same (if using DHCP, keeping the MAC address the same allows the query to the DHCP server to return the same IP address), or an IP (Internet Protocol) address can be set the same (if using a static IP address, the sleep-server can send a gratuitous ARP message for the new MAC address, i.e., MAC to IP address mapping). This VM for the particular host computer thus masquerades and replies to ICMP (Internet Control Message Protocol) requests, ARP requests, etc. as if the host computer was still awake and answering the requests itself. Furthermore the VM can execute a packet filter process (e.g., defined in a packet analyzer module) that executes a wake-up event (using the standard Wake-on-LAN functionality embedded in the network interface) to bring the host computer out of the low power state (such as S3) and resume normal operation. This can be done transparently to remote applications (no changes required) as well as the network infrastructure. Thus, sleep management can be delivered transparently, as a service, to the end host.

The invention has many applications and can achieve significant power savings in many commercial and institutional networks. For example, large enterprises, schools, small businesses, government agencies, etc. can all use the invention to save energy consumption of their networked desktop and laptop computers. Desktops routinely consume 75-150 Watts each. A prototype sleep-server of the invention (implemented as a stand alone server system) is estimated to consume about 300 Watts. So conservatively, if 100 desktops were turned off and a sleep-server architecture of the invention was employed, the power consumed would drop from 10,000 W (100*120 W average) to 500 W (100*2 W per desktop in sleep mode +300 W for the sleep server. Considering a standard work week of 45 hours (8 hours a day for five working days+5 additional hours per week for lunch, etc.) and assuming that for the other hours of the week the desktops are in a low power mode, this translates to an energy (and cost savings) of around 70% as compared to the current scenarios where these desktops are left always be on. Moreover, applications of the invention can provide opportunities for improved network management, such management processes that can identify when a particular computer is sleeping versus when it has crashed requiring additional diagnostics and repair services.

In general, one innovative aspect of the subject matter described in this specification can be embodied in methods that include the actions of receiving at a first computer, via a computer network, information regarding a second computer transitioning to a low-power mode of operation; sending at least one message over the computer network to cause at least one network switch in the computer network to change at least one assigned port for the second computer; receiving at the first computer network communications designated for the second computer, the network communications passing through the at least one network switch; processing at the first computer at least a portion of the network communications on behalf of the second computer without transitioning the second computer out of the low-power mode of operation, where the processing includes processing the at least a portion of the network communications on behalf of the second computer within a virtual machine corresponding to the second computer; and initiating, via the computer network, a transition of the second computer out of the low-power mode of operation when at least one of the network communications satisfies a predetermined condition.

These and other embodiments can each optionally include one or more of the following features. An address of the second computer (e.g., IP address, MAC address) can be assigned to the virtual machine while the second computer is in the low-power mode of operation. The first computer can run a hypervisor that manages the virtual machine among multiple, lightweight virtual machines corresponding to multiple computers to be run in the low-power mode of operation. The hypervisor can be run by multiple peer computers on the computer network, including the first computer, and management of the virtual machines corresponding to the multiple computers to be run in the low-power mode of operation can be distributed among the multiple peer computers.

A resource allocation for the virtual machine can be scaled up or down based on demands associated with the second computer in the low-power mode of operation. The computer network can include a virtual local area network (VLAN). The initiating can be performed using a Wake-on-LAN protocol packet including a media access control (MAC) address of the second computer.

Information corresponding to the second computer transitioning to the low-power mode of operation can be recorded at the first computer, where at least a portion of the recorded information defines the predetermined condition. The first computer can include a server computer system, a network switch, a network router, or a host computer. The method can also include the actions of receiving encryption keys for multiple computers on the computer network, including the second computer; and processing network communications on behalf of the multiple computers within respective virtual machines using corresponding sets of the encryption keys.

A system can include a computer network; multiple computers coupled with the computer network; a network switch in the computer network; and a sleep manager computer system coupled with the computer network and configured to perform operations including: receiving, via the computer network, information regarding one or more of the multiple computers transitioning to a low-power mode of operation; sending at least one message over the computer network to cause the network switch in the computer network to change at least one assigned port for the one or more of the multiple computers; receiving network communications designated for the one or more of the multiple computers, the network communications passing through the network switch; processing at least a portion of the network communications on behalf of the one or more of the multiple computers within one or more virtual machines corresponding to the one or more of the multiple computers; and initiating, via the computer network, a transition of the one or more of the multiple computers out of the low-power mode of operation when at least one of the network communications satisfies a predetermined condition.

The sleep manager computer system can run a hypervisor that manages the one or more virtual machines, where each of the one or more virtual machines is assigned one or both of a hardware address (e.g., MAC address) and a network address (e.g., IP address) of a corresponding one of the multiple computers. The sleep manager computer system can include multiple peer computers on the computer network that manage virtual machines corresponding to the multiple computers in a distributed process. The sleep manager computer system can be configured to perform operations including scaling up or down a resource allocation for the one or more virtual machines based on demands associated with the one or more of the multiple computers.

The computer network can include a virtual local area network (VLAN) overlying multiple separate local area networks. The sleep manager computer system can be configured to send, and the multiple computers can be configured to receive, a Wake-on-LAN protocol packet including a repeated media access control (MAC) address. The sleep manager computer system can include a server computer system, a network switch, a network router, or a proper subset of the multiple computers.

Moreover, the system can include a network attached storage coupled with the computer network and shared as a common resource of the multiple computers and the sleep manager computer system. For example, a hard drive on the network can be used to handle various state transfer information relating to the virtual machine and the host computer (e.g., files downloaded by the virtual machine on behalf of the host computer while it was asleep). Using a network attached storage drive that both the host computers and the virtual machines can see, management of the virtual machine and host computer interactions can be readily improved.

Other implementations include a storage medium encoding a program operable to cause computers to perform the operations described. According to another aspect, a storage medium encoding a program operable to cause computers to perform operations including: at a host computer, indicating a sleep mode to a sleep server and sending predetermined events and application triggers to the sleep server prior to entering the sleep mode; at the sleep server, responding to the host computer indicating a sleep mode by accepting events and application triggers; at the sleep server, for the host computer indicating the sleep mode, instantiating a new virtual-machine (VM) for the host computer and setting an address of a network interface of the VM to be the same as the host computer put to sleep; at the sleep server, using the VM to reply to predetermined requests as if the host computer was still awake and to awake the host computer for predetermined wake-up events. The instantiation can include allocating memory and processing resources for the new VM, which was previously registered in the sleep server for the host computer.

The described systems and techniques can be implemented in electronic circuitry, computer hardware, firmware, software, or in combinations of them, such as the structural means disclosed in this specification and structural equivalents thereof. This can include computer storage media encoding one or more programs operable to cause one or more programmable computers, which include one or more processors, (e.g., a sleep server system) to perform operations described. Thus, program implementations can be realized from a disclosed method, system, or apparatus, and apparatus implementations can be realized from a disclosed system, program, or method. Similarly, method implementations can be realized from a disclosed system, program, or apparatus, and system implementations can be realized from a disclosed method, program, or apparatus.

Details of one or more implementations are set forth in the accompanying drawings and the description below. Other features and advantages may be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

This application describes systems and techniques that permit computers to remain accessible while in a low-power mode. For example, the invention allows desktop and laptop computers that are idle and are connected over a network (wired, wireless, or both) to be turned off or put to a low power mode such as Sleep (Called S3 in ACPI (Advanced Configuration and Power Interface)) and be transparently woken up when a user specified event occurs. This event can be anything such as a remote login request (Remote Desktop, SSH, File access) etc. The computers under sleep maintain their accessibility (ICMP ping responses, answer ARP requests etc, maintain DHCP leases) even though they are in a low power (e.g., sleep) mode. Since the computers are effectively in a low power state and can be woken up "on demand", the energy savings are substantial. The disclosed approach does not require any changes to the routers, switches, or any hardware additions to the desktop computers themselves that want to use this approach, and only needs software on the computers that want to use it as well as the addition of a "sleep-server".

Figure 1:
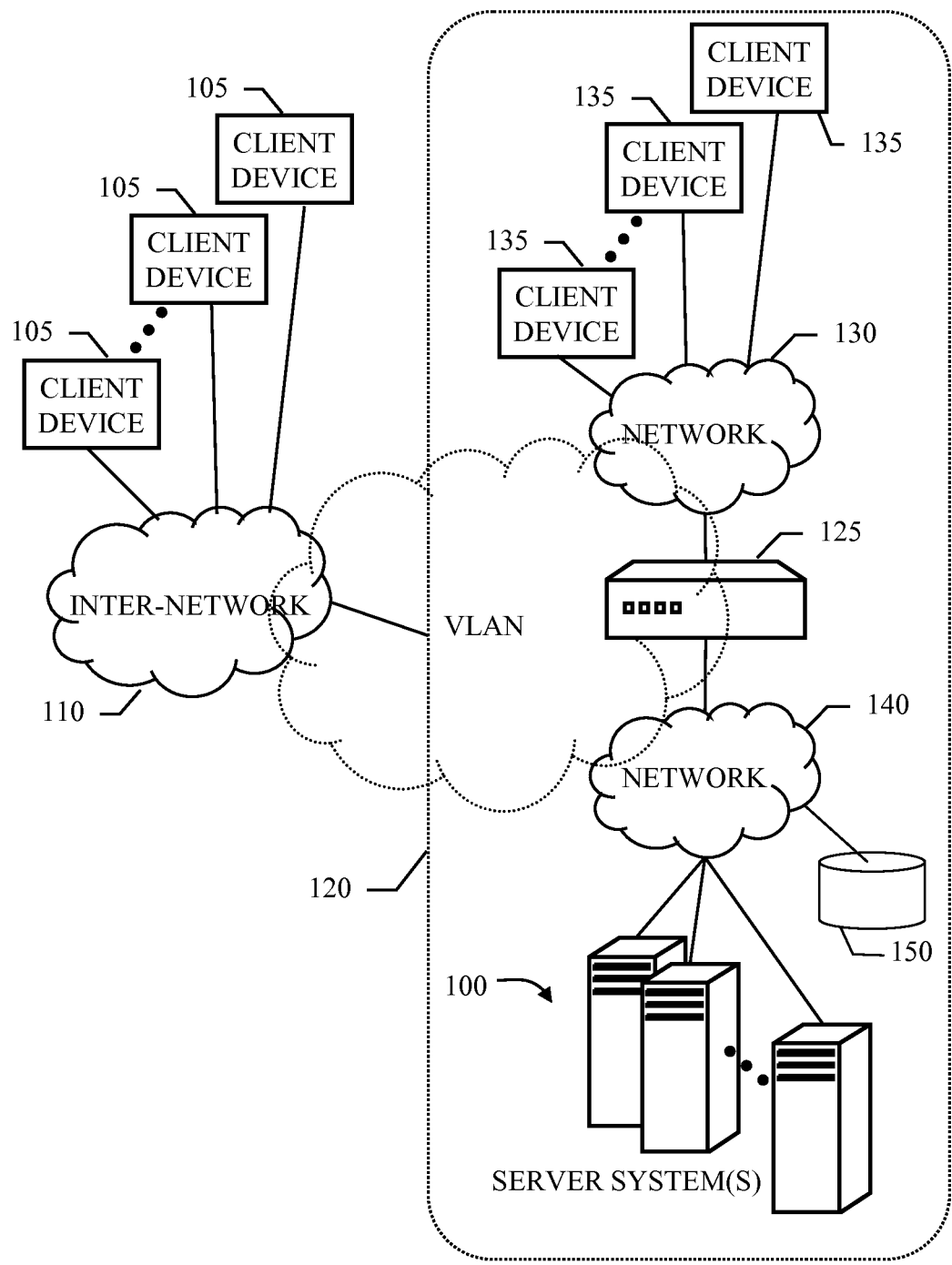
FIG. 1 is a block diagram showing an example of system(s) and an operational environment that permit computers to remain accessible while in a low-power mode.

FIG. 1 is a block diagram showing an example of system(s) and an operational environment that permit computers to remain accessible while in a low-power mode. A server system 100 provides a sleep management service, as is described herein. The server system 100 can be a stand alone server computer or a server cluster. Moreover, the server system 100 need not be implemented in a typical server system environment, but can also be implemented in various network devices, such as a network switch and a network router, or can be a distributed sleep management system that runs on multiple host computers on a computer network (e.g., on devices 135).

The server system 100 can be part of a network system 120, such as an Enterprise Network. The network system 120 can include one or more networks 130, 140, which can be a single local area network (LAN) (e.g., an Ethernet LAN), or multiple LANs connected together into an inter-network. In any case, somewhere within the network system 120, a network switch 125 (e.g., a Layer 2 switch or Layer 3 switch) makes determinations regarding where to forward packets for one or more client devices 135 within a LAN.

Client devices 135 can include any computer that may take advantage of the sleep management service provided by the server system 100. For example, the client devices 135 can include desktop person computers, laptops, work stations, consumer electronic devices, mobile devices, etc. In any case, the client 135 is connected to a LAN through at least the network switch 125. Note, however, that this LAN can be a virtual LAN (VLAN) that overlays a more complex network topology. Use of a VLAN allows various functionality, and of note for this disclosure, allows multiple network segments (or subnets) to all be available on the same physical Ethernet wire. Thus, in addition to client devices 135, more client devices 105, which are connected to the network system 120 through a public inter-network 110 (e.g., the Internet), can also take advantage of the sleep management service provided by the server system 100.

Various computers 105, 135 can use the server system 100 to save substantial power by transitioning to low power modes, while also still being accessible and able to be woken up to full power mode as desired. This can be accomplished without any hardware modifications or additions to the individual computers 105, 135 and can work with existing machines. This can be achieved, for example, by designing sleep-server software in a networked and distributed computing environment that maintains a virtual machine (VM) for each of the networked computers in a low power mode.

In addition, the system can include a network attached storage 150, which can be coupled with the computer network (e.g., the VLAN) at various locations. The network attached storage 150 can be shared as a common resource of the client devices 105, 135 and the system 100. For example, a hard drive on the network can be used to handle various state transfer information relating to the computers 135 (e.g., files downloaded by the system 100 on behalf of a computer 135 while it was asleep). Using a network attached storage drive that both the computers 135 and the system 100 can see, management of the virtual machine and host computer interactions can be further improved.

Figure 2:
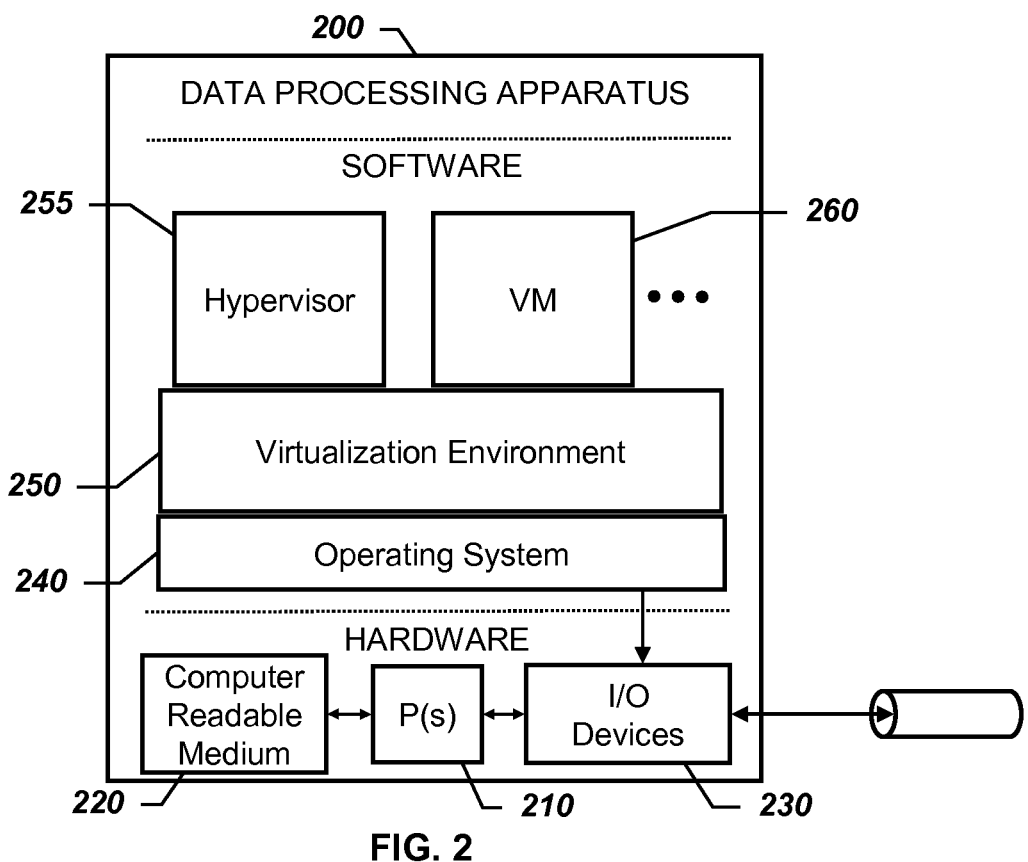
FIG. 2 is a block diagram showing an example of data processing apparatus used to manage the sleep mode(s) of operation of computers on a network.

FIG. 2 is a block diagram showing an example of data processing apparatus 200 used to manage the sleep mode(s) of operation of computers on a network. The data processing apparatus 200 is also referred to as a "sleep-server" since it can operate in a server mode with respect to sleep management, even though some implementations do not require a dedicated server computer. For example, the data processing apparatus 200 can represent multiple computers, where the sleep management function is provided as a distributed service operating in a peer-to-peer environment.

The data processing apparatus 200 includes one or more processors 210 (e.g., a microprocessor and chip set on an integrated circuit board), a computer readable medium 220 (e.g., a magnetic disk in a disk drive), and input/output devices 230 (e.g., keyboard, mouse, display, network connection(s), etc.) in a hardware portion of the apparatus 200. A software portion of the apparatus 200 includes a virtualization environment 250 and one or more virtual machines (VMs) 260 that correspond to computers 105, 135 whose sleep state is being managed. The virtualization environment 250 can run on an operating system 240 as shown, or the virtualization environment 250 can run directly on the physical machine. Thus, in some implementations, the operating system 240 is not present.

The VMs on the sleep-server act on behalf of each of the computers they represent as their proxy agents. These VM agents can be designed to run in a minimal memory and processor footprint, thus allowing hundreds of computers to be represented by a single sleep-server computer. This results in substantial savings in energy and also provides a method to scale up the dynamic power management algorithms that use power state and other important information from individual computers in large scale compute, data and storage servers. Furthermore these individual VMs can themselves be scaled up, even dynamically, in terms of memory allocated and processing capabilities based on individual VM requirements as they relate to the demands placed on what actions that a sleeping machine can perform.

The virtualization environment 250 includes a hypervisor 255 that manages a protected domain for the virtualization environment 250, and also user domains corresponding to the VMs 260. These VMs 260 are thus used not simply for dynamic resource management and for security and protection, but also to create proxy agents that copy functions of a computer, to act on that computer's behalf while it is in a low power mode of operation. The VMs 260 can be lightweight virtual machines corresponding to multiple computers to be run in a low-power mode of operation. Note that the operating system 240 can be the same or different than the operating systems of the computers the VMs 260 are acting on behalf of.

The hypervisor 255 can scale up or down the resources provided to the individual VMs 260 based on need at any given time. The hypervisor 255 can also employ copy-on-write techniques to scale to more VMs than might otherwise be possible based on physical memory constraints. Moreover, in distributed peer-to-peer implementations, the hypervisor 255 can be run by multiple peer computers (e.g., among the devices 135), and hypervisor 255 can manage the VMs 260, corresponding to the multiple computers to be run in the low-power mode of operation, in a distributed fashion among the multiple peer computers. Likewise, in peer-to-peer implementations, the multiple sleep-servers and the hypervisors can communicate as well to determine which machines they are proxying for.

As and when required trigger events are met, such as a remote login request for a particular host in low power mode, that particular computer can be woken up using the well known and widely implemented Wake-on-LAN standard (or its wireless equivalent, WoWLAN), while its corresponding VM on the sleep-server is automatically disabled or removed. This can be done without any changes to the remote host computers beyond enabling the WoL functions, or the underlying network infrastructure (i.e., network switches or routers).

Wake-on-LAN (WOL), which has been implemented on many motherboards as a part of the Ethernet controller, is a current standard that is used to wake-up remote computers. WOL is managed by the operating system (e.g., the WINDOWS® OS) and supported by BIOS (Basic Input Output System). WOL typically requires internet routing infrastructure support to pass Wake-on-LAN packets. Even as a standard, there are various reasons why Wake-on-LAN doesn't work well thus forcing users at home and in data centers to keep their machines on. A fundamental reason is the "semantic gap" from application needs versus the network level actions taken by WOL. Further, a very coarse-grained wakeup action that can miss important events or cause too frequent wakeups, and lack of configurability to provide selective wakeup events and actions, severely limit adoption of WOL. In some implementations, Wake-on-WirelessLAN (WoWLAN) can also be used.

In contrast, the present sleep-server architecture enables a host computer to be put into a low power mode (such as sleep) by moving over some of its functionality (e.g., maintain network presence) to a corresponding virtual machine (VM) on a sleep-server (e.g., a dedicated separate server). The VMs running on the sleep-server can create the illusion of host computer as being on and fully available to the remote computers. The VMs can be configured (dynamically or statically) to take care of certain tasks on behalf of the host computers. They can also be architected such that in case and only when they are unable to respond or take care of some tasks, they are disabled and the corresponding host computer is woken up seamlessly. In some implementations, hundreds of VMs can be consolidated on a single sleep server, and thus, the energy gains can be substantial. Other embodiments can use specialized or customized machines that are better tuned to creating, configuring and dispatching of such proxy agents.

Figure 3A:
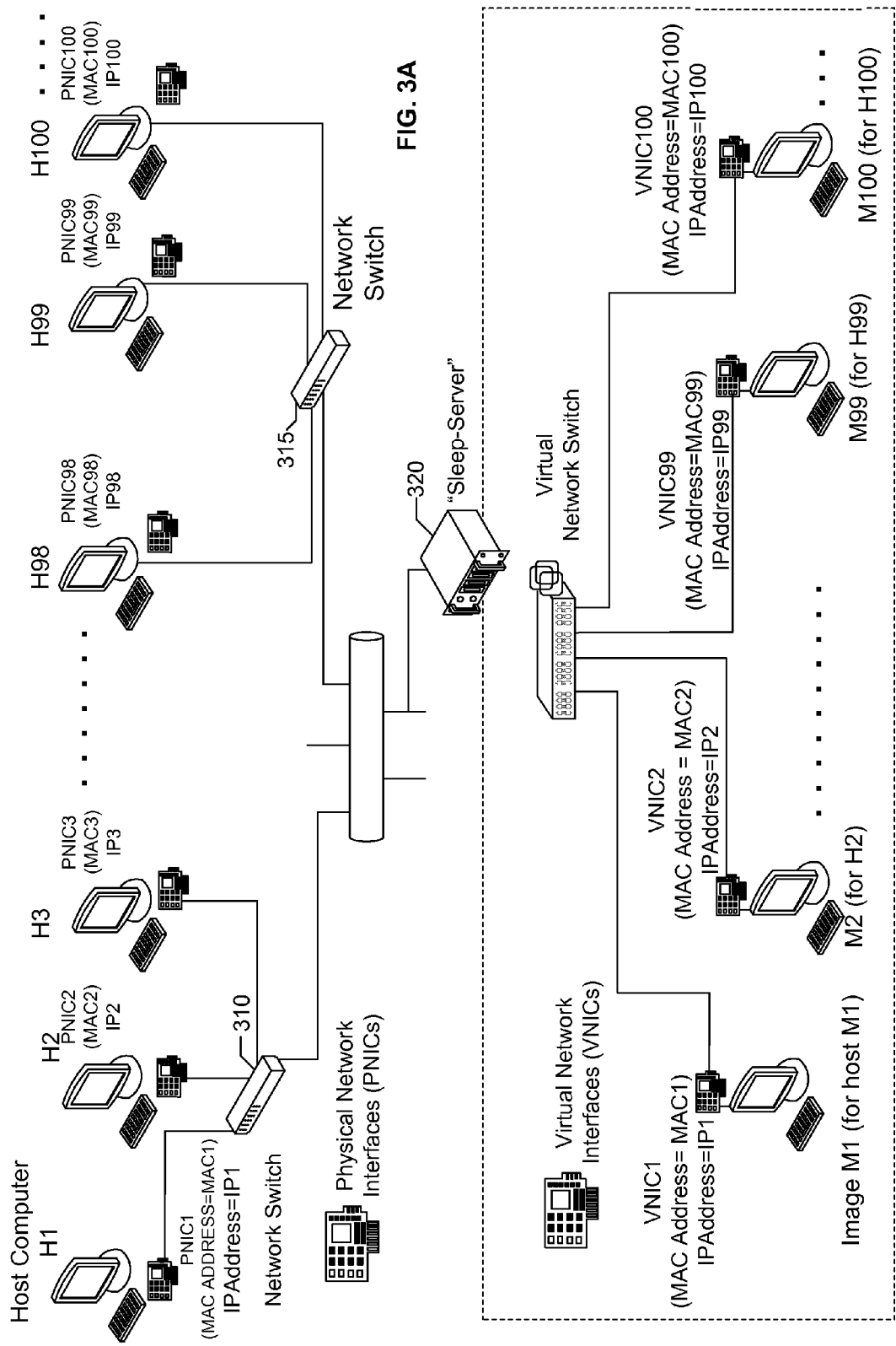
FIG. 3A is a block diagram showing an example of a sleep-server system.

FIG. 3A is a block diagram showing an example of a sleep-server system. Host computers H1-H100 communicate through a network including network switches 310, 315 with a sleep-server 320. In addition, the wake-up triggers for each host computer HN can be specified with respect to each host computer (e.g., by the host computer itself) or be determined automatically (e.g., by the sleep-server 320).

A host computer HN can be any computing device such as a netbook, laptop, desktop or a server. Before a host computer goes to a low power state, such as sleep (S3-suspend to RAM) or hibernate (S4-suspend to hard disk), it transfers over events and specific applications triggers that it cares about being responsive to, to the sleep-server 320. These can be events such as Wake-up on an incoming Remote Desktop or SSH Request, or Wake-up on Voice-over-IP (VoIP) call, etc.; or any combination thereof. Users can also just specify the applications that they care about and the wake-up triggers can be extracted using the TCP/UDP ports that each of the applications are listening on (e.g., Remote Desktop (TCP: 3389), SSH (TCP: 22), VoIP (UDP: 5060), etc.). These wakeup events and triggers can be less restrictive (e.g., wake up on an RDP or SSH request from any IP address) or more restrictive (e.g., wake-up on an RDP or SSH request from a particular IP address only) and can utilize any field of the protocol headers across different layers (e.g., Transport Layer: TCP/UDP, Routing layer (IP), MAC layer, etc.). The wake-up triggers can even be based on application layer triggers (e.g., an instant message from a specific friend, or when a particular file becomes available for download on a Peer-to-Peer network, etc.).

It should be noted however that, while substantial portions of this description detail sleep actions in relation to the ACPI standard on Windows-Intel machines, alternative sleep states and standards can also be used to manage the low power operation of the computing machines, other than Windows-Intel machines, in the sleep-server architecture. From a capability point of view, a very general method can be provided, where the wake-up events can be any regular expression based on any of the protocol header fields. As such, these wake-up events, as a combination of events and actions, can be specified at and across multiple layers of the networking protocol stack. In some implementations, the wake-up can also be triggered based on checks within the payloads of network packets. In any case, the host computers using this architecture can be added to the architecture with only minor software additions, so that it can communicate with the sleep-server 320, as required.

The sleep-server 320 can be implemented as a specialized piece of software running on a general-purpose computing machine. The term "sleep-server" is used to refer to both the server software as well as the underlying machine, with the distinction that is clear by the context. Typically, the sleep-server machine is a commodity server class machine. Depending on the number of hosts that want to utilize this architecture, the sleep-server can range from a modest hardware configuration (e.g. single core CPUs, <2 GB of RAM) to more capable machines (e.g. multi-core CPUs, 10s of GBytes of RAM for 100s of hosts). For larger enterprises having 1000's of computers there can be several sleep-servers, while for a small business with 10's of PCs the sleep server can just be an ordinary desktop class machine. Sleep-server can also be a specialized or customized machine (such as one using FPGAs or multi-processor arrays) that is tuned to fast creation and management of the Virtual Machines as proxy agents for the host machines.

Figure 3B:
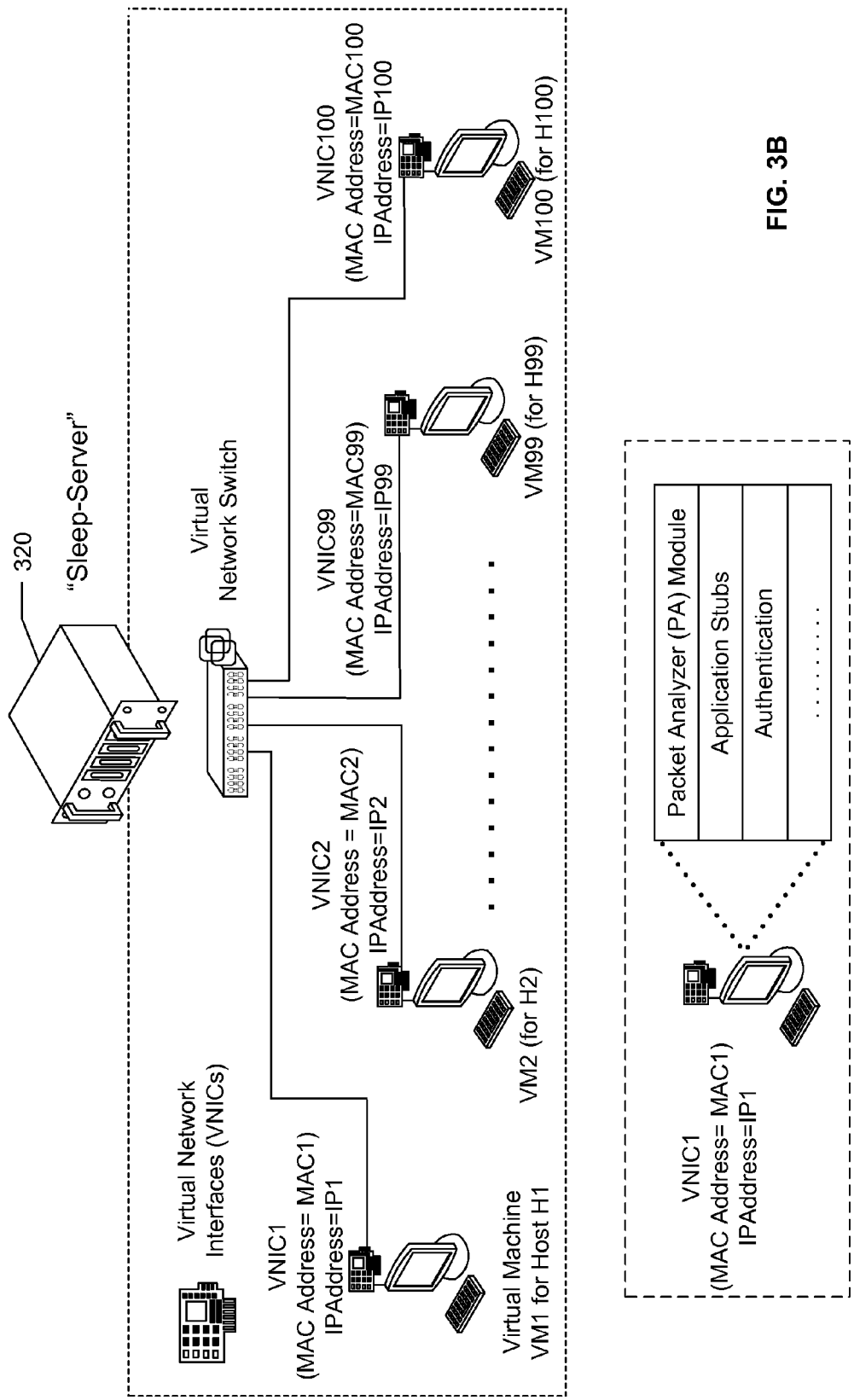
FIG. 3B is a block diagram showing an example of a sleep-server.

A host computer/machine HN can coordinate with the sleep-server 320 initially and specify various parameters such as its hardware address (e.g., network MAC address), its network address (e.g., IP address), and protocol information (e.g., DHCP or Static IP). This configuration information (usually one time only) is used by the software running on the sleep-server machine to create a Virtual Machine (VM) with appropriate parameters. When using the DHCP configuration, the MAC address needs to be set the same for each respective Host-VM pair (as shown in FIGS. 3A and 3B). Thus, when the VM queries the DHCP server, it gets the same IP address. When using Static IP, the VM can have a different MAC address than its corresponding Host, since the VM can send a gratuitous ARP packet for the new MAC address (i.e., Mac to IP address mapping).

In addition, while the state of the art may not use Trusted Platform Modules (TPMs), TPMs may well be prevalent as hardware Root of Trust (ROT) in the future. In such a case, this approach allows for virtualization of the TPM functions by the Virtual Machines (in a Trusted Virtual Machine) that will provide access to TPM functions via appropriate API calls.

Since the network parameters (e.g. IP address and in some cases the MAC address) for the host and the corresponding VM are the same, they appear identical to any other host in the network. These VMs can be designed to be lightweight, by installing only the most essential software and feature a complete network protocol stack. In particular, they do not need to provide the graphics (GUI) and human interface capabilities of real-machines. As a result the VMs themselves can be run using extremely modest memory (e.g., <64 Mbytes of RAM each) and processing resources. This can make the sleep-server architecture very scalable, where a single sleep-server can handle hundreds of such VMs for the corresponding host computers that are in a low power state.

Additionally there may be specific applications that may be running on the host computers that need to communicate continuously, essentially requiring the host computer to be kept on in the first place. Examples of such applications include Peer-to-Peer (P2P) file sharing applications, instant messaging (IM) programs, programs that send periodic keep-alive messages, etc. For these classes of applications, application-stubs can be built. These are essentially reduced-functionality variants/avatars of the full fledged applications running on the host computers that can instead be run on the VMs.

For example, an application stub for a full-fledged graphical P2P application that supports Peer-to-Peer (P2P) file sharing using the bit-torrent protocol can be a text-only variant that supports the bit-torrent protocol but does not have any of the graphical components. Depending on the applications of interest, these "application-stubs" and their corresponding authentication credentials (e.g., passwords for various IM networks or authentication keys via the chain of trust from a TPM) can be installed on the corresponding VMs running on the sleep server. There may be other alternatives for creating these "application-stubs" to get similar functionality, such as the use of automatic protocol inference engines for different applications in order to understand their protocol behavior. This can then be used to replay the protocol without having to implement the individual applications-stubs on the VMs.

Various implementations of VMs can be used to achieve isolation, security and protection guarantees across proxy agents. Systems and methods that can achieve these or similar capabilities can include containerized VMs and/or multiple aliased network interfaces. However, the use of VMs can also allow for construction of read-only VM images (that use copy-on-write or similar mechanisms) which can further reduce the memory footprint of individual VMs. Correspondingly, individual VMs can also be scaled up (in memory and CPU resource allocation) based on application demands. That is, each VM can be started with a minimal memory footprint, which is then increased if the application stubs need more resources.

When a host computer HN goes to sleep, it can transfer the wake-up events to the sleep-server 320 as described herein. If this set of wake-up events/triggers are fairly static, for instance, they occur for the same set of applications, then the default set of triggers can be setup once and later reused. The host computer can transition to a low power state (such as S3), either by the user explicitly putting it to sleep, or by power management triggers (e.g., timer based in-activity triggers) or by other mechanisms. This transition to a low power mode can be notified to the sleep-server 320 either explicitly by the host itself, or can be detected automatically by the sleep server (e.g., ICMP Ping to the host or an ARP lookup for the MAC address of the host does not elicit a response).

Once it is determined that a particular host has transitioned to a low power state, the VM corresponding to that particular host is enabled on the sleep-server; with the network interface of the VM configured identically to the host computers network interface (such as described above) before it transitioned a low power state. It should be noted that proxy agents created for sleep-servers can also be used for other purposes, such as increased availability and reliability of the data centers. In addition, the VM used for a particular host can be delegated from a pool of existing VMs, where the network parameters for the VMs are set up dynamically.

The sleep server 320 can then maintain network connectivity and the illusion of accessibility to the hosts. In reality, a sleeping (host) computer is unaccessible, that is it can not reply to any typical network traffic or carry on any compute tasks. However, the VM corresponding to the particular host is running on the sleep-server 320 as described above, and can act on behalf of the sleeping host computer. Since each VM has at least one of the same address as the corresponding host computer (e.g., the same IP address, and potentially the same MAC address), it can now reply to ICMP ping requests, reply to Address Resolution Protocol (ARP) queries, maintain DHCP leases, etc., as if the responses are coming from the intended host computers. Thus the illusion of continuous accessibility to the host is maintained, in a manner transparent to the unmodified underlying network infrastructure and other computers on the network.

There are several technical challenges that have been addressed to achieve transparent shift from real machines to their proxy agents. The challenges include issues such as the host computer and the sleep-servers are likely on different networks or subnets. The proxy agent may lack the necessary capabilities to respond to an incoming request or computational load. While mechanisms and necessary interfaces, including the use of virtual LANs on the sleep server, can be provided to overcome these challenges, increased latency may be seen by a remote application in which case dynamic expansion of VM capabilities becomes necessary.

Before the host computers transitioned to a low power mode, the necessary wake-up events and triggers can be specified and transferred over to the sleep-server, as described above. Alternatively, if the necessary wake-up triggers were transferred earlier and have not changed, the original or default triggers can be used directly by the sleep-server. These wake-up events and triggers are then subsequently used by the sleep-server to configure the individual VMs for each of the hosts since the wake-up triggers can be unique to each host. FIG. 3B is a block diagram showing an example of a sleep-server 320, which includes a virtual machine VM1 for Host H1.

Each individual VM can execute several pieces of software. First, they can execute a packet-analyzer (PA) module that captures all packets destined for the network interface of the VM. The PA module is able to handle all applications that do not need to maintain open network connections and are serviced only by listening to network sockets on designated ports (e.g., the default RDP port is TCP port 3389). Since the PA module can interpret the various protocol headers (MAC, IP, TCP/UDP, etc.), it can also be used to recognize triggers based on any field of the protocol headers as well (e.g., RDP request from a particular IP address), or based on contents of the data payload.

A wide variety of applications and their corresponding wake-up trigger events can thus be handled by the PA module. It is important to note that for the applications handled by the PA module, there need be no part of the application itself executing on the VM, and any new application in this category can be supported by adding the appropriate protocol (TCP/UDP) port number. Applications that use protocols such as TCP, which is both stateful and connection-oriented, need additional care to be handled by the PA module. The initial packets of the incoming connection request are detected by the PA running on the VM, and triggers wake-up of the host computer. Since these packets are part of a connection-oriented session establishment, they need to be passed to the host computer and inserted into its protocol stack. Alternatively, mechanisms such as explicit acknowledgements and retransmissions can be used, which are supported by these connection-oriented and stateful protocols to deal with lost packets. In this case, the initial packet is detected by the PA to wake-up the host computer, and the subsequent re-transmitted packet is successfully received by the fully active host computer itself.

Another class of applications are of the "active" class, wherein they maintain open network connections and either send periodic keep-alives (e.g., VoIP, IM) or send/receive periodic updates (e.g., IM), or even do continuous data transfer (e.g., Peer-to-Peer protocols such as bit-torrent). Applications in this category should not be handled purely by the passive PA module approach and their application semantics should be captured appropriately. These applications can be handled by creating "application-stubs" which are essentially stripped down versions of the applications (i.e., especially the protocols semantics), with the user interface components removed completely or reduced. The authentication credentials (e.g., username/password for an IM network) are also configured. This approach takes into account the fact that most modern protocols and applications are resilient to transient disconnections (common due to wireless physical interfaces) and just resume on network reconnection. Thus, when the host computer transitions to a low power state (main applications running on the host are shut down), the application stubs running on the corresponding VMs take over and resume operation.

Once the relevant wakeup event is detected, an appropriate mechanism can be used to wakeup the sleep host computer (e.g., in S3 or S4 states in the ACPI standard) remotely. To provide this functionality a commonly implemented mechanism from Wake-on-LAN (WOL) embedded in most modern network interfaces (as a part of Ethernet or PCI controller) can be used. Since the sleep-server has a presence in all the local subnets for the various host computers that it supports, it can send out the WOL 'magic packets' (e.g., a specially formed packet with sixteen copies of the MAC address of the device to wake) on the particular subnet for a host, without requiring any additional network infrastructure support (e.g., no routers support). There can also be mechanisms that allow only the authorized sleep-server to send the WOL magic packets (e.g., by disabling routers forwarding WOL packets and limiting subnet broadcasts, such as by configuring network switches, e.g., network switch 125, or routers to restrict a number of authorized senders of the Wake-on-LAN protocol packet). For example, router level Access Control Lists (ACLs) can be used in some implementations to effect this restriction. This can provide some security against attacks involving a malicious party trying to thwart the energy management scheme by spuriously waking up hosts in a low power state.

As explained above, each individual VM can execute the packet analyzer (PA) and the various application stubs. When the appropriate wake-up event is detected (e.g., Incoming RDP request), the sleep-server immediately disables the particular VM and sends a WOL magic packet to the appropriate host computer to bring it out of the low power state (e.g. Sleep/S3). All subsequent packets are handled by the host computer itself.

Once the host computer resumes from the low-power state, it is ready to communicate after a short delay taken to initialize the devices including the network interface. In modern networks, there may be multiple cascaded network switches that execute a protocol such as the Spanning Tree Protocol (STP) to detect and learn which switch port packets meant for a particular host need to be sent to.

Since a VM on the sleep-server was servicing packets meant for the host computer when it was sleeping (which may be on a different switch port), the switch ports need to be updated so as to reflect the host computer now being active. In order to update the switches the host computer can either send a few packets to the gateway node or alternatively send "gratuitous-ARPs" advertising its IP-to-MAC address mapping. Although there may be other mechanisms as well, these two mechanisms work well to update the network switches. Once the update propagates, all subsequent packets meant for the host computers MAC address are then forwarded to the appropriate switch port, and subsequently to the appropriate host computer (rather than its proxy agent).

At this point, the communication between the host computer (now awake and fully active) and the remote host or application that triggered the wake-up (e.g., RDP request) can proceed as normal, as if the host computer was always awake.

By architecting proxy agents for sleep server functions, the system architect and data center operators can be provided a continuum of choices between fully-functional, high power consumption machines to essentially non-functional sleeping machines. At one extreme, proxy agents may represent 'load-balancing' functions, while at the other end they may represent resource provisioning and management functions based on user demands on the data center. The operating point must be chosen carefully. Just transferring work from heavily loaded machines to other active machines only wastes network bandwidth and potentially creates computational/communication bottlenecks in addition to the loss of work and energy efficiency due to the overheads involved in this process.

Thus, the goal is to put into low power modes (e.g., sleep) the machines (e.g., host PCs) that are not doing much work in the first place. These largely idle machines present opportunity for energy savings without a noticeable loss of performance or availability. Functionality on 'largely idle' (idle or lightly loaded) machines can be supported by fairly small virtual machines on a networked 'sleep-server' machine. Thus, hundreds of VMs can be instantiated on a single Sleep Server. The lightweight VM functionality is complemented by the ability to wake-up the host machines on demand. Thus, the actual computer power/resources that users can get when the hosts are up again are not compromised.

More importantly, such encapsulation and isolation of specific functions of a machine provides the ability to construct system architectures (without hardware changes) that provide increased security, protection, reliability and availability guarantees than fully configured systems with large 'attack surfaces'. For instance, packet processing (packet filtering, matching at L2/L3) can be done within the present VM architecture to provide isolation guarantees across applications and ability to match VM capabilities against application stubs for performance needs.

Figure 4:
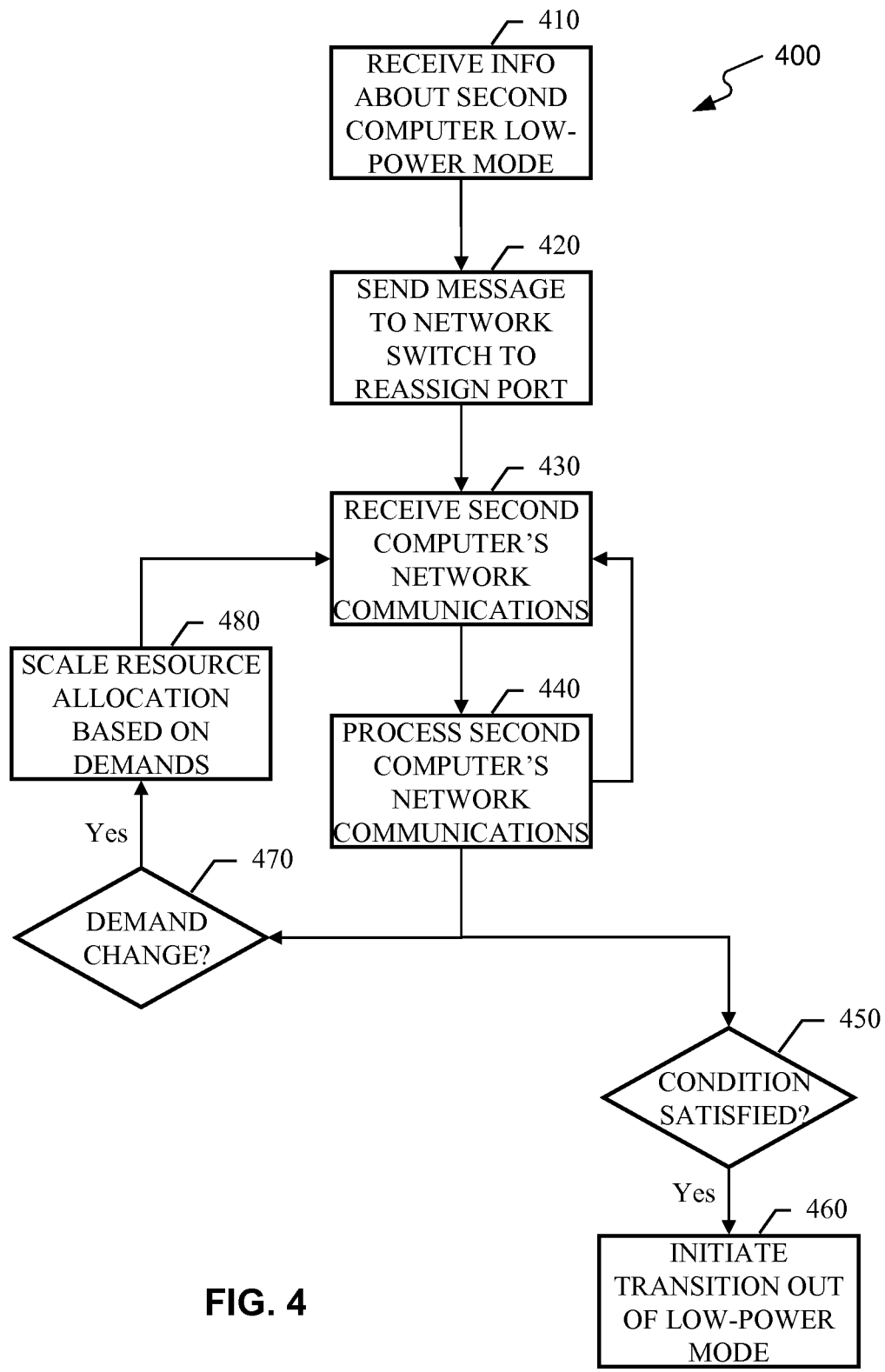
FIG. 4 is a flow chart showing an example of a low-power mode computer management process.

FIG. 4 is a flow chart showing an example of a low-power mode computer management process 400. Information regarding a second computer (e.g., device 135) is received 410 at a first computer (e.g., server system 100), via a computer network (e.g., network 130), where the second computer is transitioning to a low-power mode of operation. This can involve receiving information that results from monitoring the status of the second computer, or information that is sent by the second computer to the first computer before it transitions into a low-power state (e.g., sleep or hibernate, etc.).

For example, the end host computer can have software installed that communicates with a sleep management computer before the end host computer enters a low-power mode of operation. The host computer uses this communication to ask the sleep management computer to act on its behalf and also potentially to specify one or more conditions upon which the sleep management computer is to wake up the host computer, such as described in detail above. The communication from the host computer can include the MAC address, IP address and the hostname for the host computer, and the protocol (dynamic DHCP or static IP) it is using, as well as any regular expression based on any of the protocol header fields for triggering a wake up.

At least one message is sent 420 over the computer network to cause at least one network switch in the computer network to change at least one assigned port for the second computer. This reassignment of the port for the network switch allows future packets intended for the second computer to be forward to the first computer instead. For example, the first computer can send a gratuitous ARP packet as described above to communicate the new destination for packets intended for the second computer, and the MAC address of the second computer can be assigned to a corresponding virtual machine at the first computer. This virtual machine can be instantiated as needed, or in some implementations, this virtual machine is instantiated during an initialization phase well before the computer transitions to the low-power mode. Moreover, a pool of VMs can be instantiated and kept waiting, which can reduce the latency of enabling the particular VM (VM1) for a particular host (H1) that has transitioned into a low-power mode.

Network communications designated for the second computer then pass through the at least one network switch and are received 430 at the first computer. At least some of these network communications are also processed 440 on behalf of the second computer without transitioning the second computer out of the low-power mode of operation. This processing can involve processing packets that relate merely to basic accessibility (e.g., respond to ping messages, answer ARP requests, maintain DHCP leases, etc.). Moreover, this processing can involve processing packets for application level programs, such as described above.

The processing 440 is performed on behalf of the second computer within a virtual machine corresponding to the second computer. This virtual machine can be a lightweight virtual machine that starts out with a minimal initial footprint (e.g., a small OS that runs at 20 MB RAM, where the VM can be started with only 32 or 64 MB of RAM), which can then be scaled up or down based on need. Thus, if there is a change in demand 470 for the processing being performed on behalf of the second computer, then a resource allocation can be scaled 480 based on the demands of this processing.

The resource allocation can correspond to memory usage, processing cycles, network bandwidth, storage space or a combination of these. Scaling the resource allocation can involve increasing or decreasing the resource(s) made available to the virtual machine based on changes in demands for the processing being performed on behalf of the second computer. For example, a file download process may be delayed by a remote system, and thus the virtual machine may not need substantial resources; then, once the remote system begins transferring the file, the virtual machine can be given greater resources for the file transfer. As another example, the resource(s) allocated to a particular virtual machine can be based on the number and/or type of application stubs being run by the virtual machine.

When at least one of the network communications satisfies a predetermined condition 450 (e.g., a condition determined by the sleep-server system or a condition specified by the second computer), a transition of the second computer out of the low-power mode of operation is initiated 460 via the computer network. This can involve using a Wake-on-LAN protocol packet including the MAC address of the second computer. Alternatively, another mechanism can be used to wake the second computer, such as Intel AMT or other wakeup technology.

Figure 5:
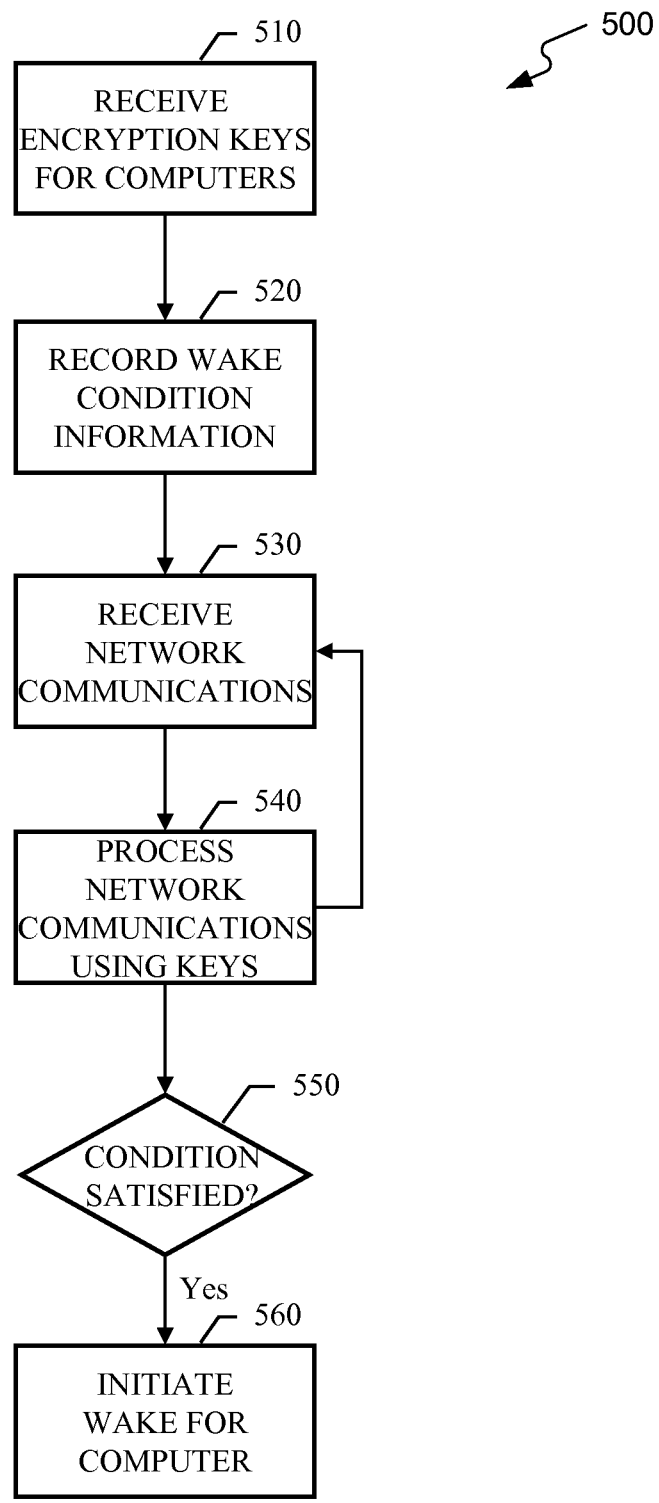
FIG. 5 is a flow chart showing another example of a low-power mode computer management process.

FIG. 5 is a flow chart showing another example of a low-power mode computer management process 500. Encryption keys for multiple computers on the computer network are received 510. These keys can be received upfront, before any particular computer has indicated a transition to a low-power mode of operation (e.g., during an initialization phase), or these keys can be received at the time the computers transition to a low-power mode of operation. These keys can be specified by an enterprise that manages the computer network and can assist in maintaining security.

Enterprises often use some sort of security policies such that the traffic between PCs is encrypted (e.g., using IPSec). Since all the PCs are part of the same enterprise domain, all the encryption keys are usually distributed by a centralized controller. Thus, in some implementations, the individual VMs (for each individual host PC) can also copy over these keys so that the VMs can act on the behalf of the hosts. Thus, by employing the same security policies in the VMs as done by the host PCs, the network presence can be maintained for the computers.

Information corresponding to the computers transitioning to the low-power mode of operation is recorded 520 at the first computer, where at least a portion of the recorded information defines one or more wake conditions. Each VM can keep track of information, including wake conditions, specific to the corresponding host computer. This information is recorded as needed, such as when the host computer includes new wake conditions in a request for sleep service due to its transition to a low-power mode of operation.

Network communications are received 530 on behalf of the multiple computers, and at least some of these network communications are processed 540 on behalf of the multiple computers within respective virtual machines using corresponding sets of the encryption keys (e.g., using IPSec). Moreover, when at least one of the network communications satisfies a predetermined condition 550 for a given one of the multiple sleeping computers, a transition of that computer out of the low-power mode of operation is initiated 560 via the computer network. This can involve using a Wake-on-LAN protocol packet including the MAC address of the second computer, or any other wakeup technology.

Only a few implementations are described. However, it is understood that variations and enhancements may be made. For example, some implementations can use multiple forms of Virtual Machines. Some implementations can avoid the use of Virtual Machines completely, where independent programs/processes can be provided for each host represented, and each of these programs/processes is responsible for constructing the appropriate packet as a response and detecting the wakeup conditions. Instead of using VMs, such implementations can include having aliased networked interfaces on the Sleep-Server, which have the same address as the host PCs (e.g., the same IP address and potentially the same MAC address), such that all traffic meant for that particular host is sent to the Sleep-Server (note that implementations using aliases can have a subset of the functionality of a VM based implementation).

The processes described above, and all of the functional operations described in this specification, can be implemented in electronic circuitry, or in computer hardware, firmware, software, or in combinations of them, such as the structural means disclosed in this specification and structural equivalents thereof, including a computer storage medium (or multiple of such) encoding a program (or multiple programs or modules of computer program instructions) operable to cause a programmable computer, which includes processor(s), to perform operations described. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple compact disks, hard disks of a disk drive, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a runtime environment, a virtual machine, or a combination of one or more of them. The apparatus and execution environment can realize various different computing model infrastructures, such as web services, security protocols, distributed computing and grid computing infrastructures.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a network switch, or a network router, to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. It will be appreciated that the order of operations presented is shown only for the purpose of clarity in this description. No particular order may be required for these operations to achieve desirable results, and various operations can occur simultaneously.

Other embodiments may be within the scope of the following claims.

What is claimed is:

1. A method comprising:
   receiving, at a first computer, via a computer network, information regarding a second computer transitioning to a low-power mode of operation;
   sending at least one message over the computer network to cause at least one network switch in the computer network to change at least one assigned port for the second computer, wherein the change allows network communications intended for the second computer to be forwarded to the first computer;
   receiving, at the first computer, network communications designated for the second computer, the network communications passing through the at least one network switch; and
   processing, at the first computer, at least a portion of the network communications on behalf of the second computer without transitioning the second computer out of the low-power mode of operation, where the processing comprises processing the at least a portion of the network communications on behalf of the second computer within a virtual machine that copies at least some functions of the second computer.

2. The method of claim 1, further comprising assigning an address of the second computer to the virtual machine while the second computer is in the low-power mode of operation.

3. The method of claim 1, further comprising running, at the first computer, a hypervisor that manages the virtual machine among multiple, lightweight virtual machines corresponding to multiple computers to be run in the low-power mode of operation.

4. The method of claim 3, further comprising:
   running the hypervisor by multiple peer computers on the computer network, including the first computer; and
   distributing management of the virtual machines corresponding to the multiple computers to be run in the low-power mode of operation among the multiple peer computers.

5. The method of claim 1, further comprising scaling up a resource allocation for the virtual machine based on demands associated with the second computer in the low-power mode of operation.

6. The method of claim 1, where the computer network comprises a virtual local area network (VLAN).

7. The method of claim 6, further comprising:
   initiating, via the computer network, a transition of the second computer out of the low-power mode of operation when at least one of the network communications satisfies a predetermined condition, and where the initiating is performed using a Wake-on-LAN protocol packet including a media access control (MAC) address of the second computer.

8. The method of claim 1, comprising recording, at the first computer, information corresponding to the second computer transitioning to the low-power mode of operation, where at least a portion of the recorded information defines the predetermined condition.

9. The method of claim 1, where the first computer comprises one or more of a server computer system, a network switch, a network router, and a host computer.

10. The method of claim 1, further comprising:
    receiving encryption keys for multiple computers on the computer network; and
    processing network communications on behalf of the multiple computers within respective virtual machines using corresponding sets of the encryption keys.

11. A system comprising:
    a computer network;
    multiple computers coupled with the computer network;
    a network switch in the computer network; and
    a sleep manager computer system coupled with the computer network and configured to perform operations comprising:
      receiving, via the computer network, information regarding one or more of the multiple computers transitioning to a low-power mode of operation;
      sending at least one message over the computer network to cause the network switch in the computer network to change at least one assigned port for the one or more of the multiple computers, wherein the change allows network communications intended for the second computer to be forwarded to the first computer;
      receiving network communications designated for the one or more of the multiple computers, the network communications passing through the network switch;
      processing at least a portion of the network communications on behalf of the one or more of the multiple computers within one or more virtual machines that copy at least some functions of the one or more of the multiple computers; and
      initiating, via the computer network, a transition of the one or more of the multiple computers out of the low-power mode of operation when at least one of the network communications satisfies a predetermined condition.

12. The system of claim 11, where the sleep manager computer system runs a hypervisor that manages the one or more virtual machines, where each of the one or more virtual machines is assigned one or both of a hardware address and a network address of a corresponding one of the multiple computers.

13. The system of claim 11, where the sleep manager computer system comprises multiple peer computers on the computer network that manage virtual machines corresponding to the multiple computers in a distributed process.

14. The system of claim 11, where the sleep manager computer system is configured to perform operations comprising scaling up a resource allocation for the one or more virtual machines based on demands associated with the one or more of the multiple computers.

15. The system of claim 11, where the computer network comprises a virtual local area network (VLAN) overlying multiple separate local area networks.

16. The system of claim 15, where the sleep manager computer system is configured to send, and the multiple computers are configured to receive, a Wake-on-LAN protocol packet including a repeated media access control (MAC) address.

17. The system of claim 11, where the sleep manager computer system comprises server computer system, a network switch, a network router, or a proper subset of the multiple computers.

18. The system of claim 11, comprising a network attached storage coupled with the computer network and shared as a common resource of the multiple computers and the sleep manager computer system.

19. A non-transitory storage medium encoding a program operable to cause computers to perform operations comprising:

at a host computer, indicating a sleep mode to a sleep server and sending predetermined events and application triggers to the sleep server prior to entering the sleep mode;

at the sleep server, responding to the host computer indicating a sleep mode by accepting events and application triggers;

at the sleep server, for the host computer indicating the sleep mode, instantiating a new virtual-machine (VM) for the host computer and setting an address of a network interface of the VM to be the same as the host computer put to sleep;

at the sleep server, using the VM to reply to predetermined requests as if the host computer was still awake and to awake the host computer for predetermined wake-up events.

20. The non-transitory storage medium of claim 19, wherein the instantiating comprises allocating memory and processing resources for the new VM, which was previously registered in the sleep server for the host computer.

* * * * *